United States Patent
Park et al.

(10) Patent No.: US 9,963,577 B2
(45) Date of Patent: May 8, 2018

(54) SILICONE RUBBER COMPOSITION AND MANUFACTURING METHOD THEREOF

(71) Applicants: HYUNDAI MOBIS CO., LTD., Seoul (KR); GRACE CONTINENTAL KOREA CO., LTD., Bucheon-si, Gyeonggi-do (KR)

(72) Inventors: Byung Sub Park, Suwon-si (KR); Kang Won Seo, Seoul (KR); Jung Hwan Lee, Yongin-si (KR); Yong Chun, Suwon-si (KR); Sung Hoon Jin, Gimpo-si (KR); Beum Keun Woo, Anyang-si (KR); David I. S Luan, Tai Po (HK)

(73) Assignees: HYUNDAI MOBIS CO., LTD., Seoul (KR); GRACE CONTINENTAL KOREA CO., LTD., Bucheon-si (KR)

( * ) Notice: Subject to any disclaimer, the term of this patent is extended or adjusted under 35 U.S.C. 154(b) by 345 days.

(21) Appl. No.: 14/803,532

(22) Filed: Jul. 20, 2015

(65) Prior Publication Data

US 2016/0102191 A1 Apr. 14, 2016

(30) Foreign Application Priority Data

Oct. 10, 2014 (KR) .................. 10-2014-0136671

(51) Int. Cl.
| | |
|---|---|
| C08K 5/5425 | (2006.01) |
| C08L 83/04 | (2006.01) |
| C08G 77/12 | (2006.01) |
| C08G 77/20 | (2006.01) |

(52) U.S. Cl.
CPC ............ *C08K 5/5425* (2013.01); *C08L 83/04* (2013.01); *C08G 77/12* (2013.01); *C08G 77/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,477,626 A * | 10/1984 | Suzuki | .................... | C08L 83/04 524/862 |
| 4,778,860 A * | 10/1988 | Morita | .................... | C08K 5/01 524/413 |
| 4,857,564 A * | 8/1989 | Maxson | ................... | C08L 83/04 523/212 |
| 5,082,886 A | 1/1992 | Jeram et al. | | |
| 5,216,104 A * | 6/1993 | Okami | .................... | C08L 83/04 524/425 |
| 6,124,407 A * | 9/2000 | Lee | ......................... | C08L 83/04 257/E23.12 |

FOREIGN PATENT DOCUMENTS

DE 3243194 A1 5/1984

* cited by examiner

*Primary Examiner* — Matthew J Daniels
*Assistant Examiner* — Kelsey C Grace
(74) *Attorney, Agent, or Firm* — Knobbe Martens Olson & Bear LLP

(57) ABSTRACT

Disclosed are a silicone rubber composition and a preparation method thereof. The silicone rubber composition comprises a polydimethylvinylsiloxane, a silica filler, a polymethylvinylsiloxane oil, a hydrogen-modified polyorganosiloxane, a platinum-based catalyst, and a polymethylhydrogensiloxane vulcanizing agent.

14 Claims, No Drawings

SILICONE RUBBER COMPOSITION AND MANUFACTURING METHOD THEREOF

CROSS-REFERENCES TO RELATED APPLICATIONS

This application claims the benefit of Korean Patent Application No. 10-2014-0136671, filed on Oct. 10, 2014 in the Korean Intellectual Property Office, the entire disclosures of which are incorporated herein by reference.

FIELD

The present disclosure relates to a silicone rubber composition and a preparation method thereof.

BACKGROUND

Silicone rubber compositions are cured by an organic peroxide curing agent, may be used in various applications, are very stable at high and low temperatures, and may exhibit various hardness values. In addition, these compositions have advantages of excellent chemical stability, water repellency, electrical properties and compression resistance. The silicone rubber composition may be prepared by mixing a high-viscosity silicone gum containing a vinyl group in the molecule with a reinforcing filler (such as fumed silica) and a processing aid to prepare a base compound, dispersing an organic peroxide curing agent in the base compound, and heating the base compound having the curing agent dispersed therein to yield a desired rubber compound.

German Patent No. 3,243,194 and U.S. Pat. No. 5,082,886 disclose the related technology.

SUMMARY

One aspect of the present invention relates to a silicone rubber composition, and more specifically, to a silicone rubber composition, which does not undergo yellowing and, at the same time, has excellent mechanical strength, resilience and mold release properties, and to a preparation method thereof.

In one embodiment, the silicone rubber composition may comprise: 100 parts by weight of a polydimethylvinylsiloxane represented by the following formula 1; about 5 parts by weight to about 100 parts by weight of a silica filler; about 0.1 parts by weight to about 15 parts by weight of a polymethylvinylsiloxane oil containing about 1 mole % to about 20 mole % of a vinyl group; about 0.1 parts by weight to about 5 parts by weight of a hydrogen-modified polyorganosiloxane containing about 1 mole % to about 20 mole % of a vinyl group and about 0.05 mole % to about 20 mole % of hydrogen; about 0.0001 parts by weight to about 3 parts by weight of a platinum-based catalyst; and about 0.1 parts by weight to about 5 parts by weight of a polymethylhydrogensiloxane vulcanizing agent:

[Formula 1]

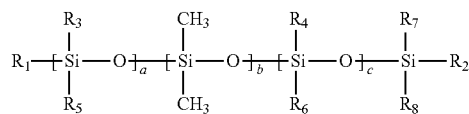

(wherein $R_1$ to $R_8$ are each independently selected from among linear or branched $C_1$ to $C_{10}$ alkyl group, $C_1$ to $C_{10}$ aminoalkyl group, $C_1$ to $C_{10}$ hydroxyalkyl group, $C_1$ to $C_{20}$ haloalkyl group, $C_3$ to $C_{15}$ cycloalkyl group, $C_6$ to $C_{12}$ aryl group, $C_7$ to $C_{20}$ aralkyl group and $C_2$ to $C_{20}$ alkenyl group; a, b and c are each an integer ranging from 1 to 100; and at least one of $R_1$ and $R_8$ is a vinyl group.)

In one embodiment, the polydimethylvinylsiloxane may have a vinyl content of about 0.01 mole % to about 0.4 mole % and a viscosity of about 10,000,000 cps to about 150,000,000 cps as measured at 25° C.

In one embodiment, the polydimethylvinylsiloxane may have a degree of polymerization of about 100 to about 20,000 and a weight-average molecular weight (Mw) of about 300,000 g/mol to about 1,500,000 g/mol.

In one embodiment, the silica filler may have a BET specific surface area of about 50 $m^2$/g to about 500 $m^2$/g.

In one embodiment, the silica filler may comprise one or more of fumed silica and precipitated silica.

In one embodiment, the silica filler may be a silica filler surface-treated with one or more of a silane-based surface treatment agent and a silazane-based surface treatment agent.

In one embodiment, the polymethylvinylsiloxane oil may have a viscosity of about 5 cps to about 500 cps as measured at 25° C.

In one embodiment, the hydrogen-modified polyorganosiloxane may be represented by the following formula 2:

[Formula 2]

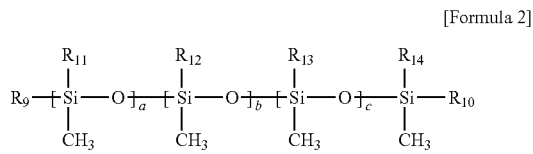

(wherein $R_9$ and $R_{10}$ are each independently selected from among hydrogen, linear or branched $C_1$ to $C_{10}$ alkyl group, $C_2$ to $C_{20}$ alkenyl group, $C_3$ to $C_{15}$ cycloalkyl group, $C_1$ to $C_{10}$ aminoalkyl group, $C_1$ to $C_{10}$ hydroxyalkyl group and $C_1$ to $C_{20}$ haloalkyl group; $R_{11}$, $R_{12}$, $R_{13}$ and $R_{14}$ are each independently selected from hydrogen, linear or branched $C_1$ to $C_{10}$ alkyl group, $C_1$ to $C_{10}$ aminoalkyl group, $C_1$ to $C_{10}$ hydroxyalkyl group, $C_1$ to $C_{20}$ haloalkyl group, $C_3$ to $C_{15}$ cycloalkyl group, $C_6$ to $C_{12}$ aryl group, $C_7$ to $C_{20}$ aralkyl group and $C_2$ to $C_{20}$ alkenyl group; l, m and n are each an integer ranging from 1 to 30; at least one of $R_9$ to $R_{14}$ is hydrogen; and at least one of $R_9$ to $R_{14}$ is a vinyl group.)

In one embodiment, the platinum-based catalyst may comprise one or more selected from among fine platinum powder, platinum black, chloroplatinate, alcohol-modified chloroplatinate, chloroplatinate-olefin complexes, chloroplatinate-alkenylsiloxane complexes, and chloroplatinate-divinyltetramethyldisiloxane complexes.

In one embodiment, the polymethylhydrogensiloxane vulcanizing agent may comprise one or more selected from among polymethylhydrogensiloxanes blocked with a trimethylsiloxy group at both ends, a copolymer of a dimethylsiloxane blocked with a trimethylsiloxy group at both ends and methylhydrogensiloxane, a copolymer of a dimethylsiloxane blocked with a dimethylhydrogensiloxy group at both ends and methylhydrogensiloxane, and tetramethyltetrahydrogen cyclotetrasiloxane.

In other embodiments, the silicone rubber composition may further comprise a plasticizer, a release agent and a curing retarder.

The plasticizer may comprise a polydimethylsilixane plasticizer; the release agent may comprise one or more selected from among stearic acid, zinc stearate, calcium stearate, and metal salts thereof; and the curing retarder may comprise one or more selected from among 2-methyl-3-butyn-2-ol, 2-phenyl-3-butyn-2-ol, 3,5-dimethyl-1-hexyn-3-ol, 1-ethynylcyclohexanol, 1,5-hexadiyne, 1,6-heptadiyne, 3,5-dimethyl-1-hexen-1-yne, 3-ethyl-3-buten-1-yne, 3-phenyl-3-buten-1-yne, 1,3-divinyltetramethyldisiloxane, 1,3,5,7-tetravinyltetramethylcyclotetrasiloxane, 1,3-divinyl-1,3-diphenyldimethyldisiloxane, methyltris(3-methyl-1-butyn-3-oxy)silane, tributylamine, tetramethylethylenediamine, benzotriazole, triphenylphosphine, sulfur-containing compounds, hydroperoxy compounds, maleic acid derivative-1-ethynylcyclohexanol, and 3-methyl-1-penten-3-ol.

In one embodiment, the composition may comprise, based on 100 parts by weight of the polydimethylvinylsiloxane, about 1 parts by weight to about 20 parts by weight of the plasticizer, about 0.01 parts by weight to about 5 parts by weight of the release agent, and about 0.001 parts by weight to about 3 parts by weight of the curing retarder.

Another aspect of the present invention relates to a method for preparing the silicone rubber composition. In one embodiment, the method for preparing the silicone rubber composition may comprise the steps of: heating a first mixture, which comprises 100 parts by weight of a polydimethylvinylsiloxane represented by the following formula 1, about 5 parts by weight to about 100 parts by weight of a silica filler, and about 0.1 parts by weight to about 15 parts by weight of a polymethylvinylsiloxane oil containing about 1 mole % to about 20 mole % of a vinyl group, at a temperature between about 120° C. and about 180° C.; depressurizing the heated first mixture to about 0.5 bar to about 0.9 bar; adding, to the first mixture, about 0.1 parts by weight to about 5 parts by weight of a hydrogen-modified polyorganosiloxane containing about 1 mole % to about 20 mole % of a vinyl group and about 0.05 mole % to about 20 mole % of hydrogen, about 0.0001 parts by weight to about 3 parts by weight of a platinum-based catalyst, and about 0.1 parts by weight to about 5 parts by weight of a polymethylhydrogensiloxane vulcanizing agent, followed by mixing at a temperature between about 50° C. and about 70° C. to prepare a second mixture; and subjecting the second mixture to molding and first curing to prepare a first cured product:

[Formula 1]

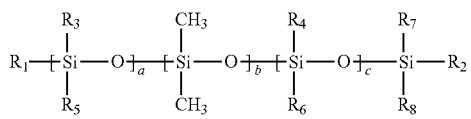

(wherein $R_1$ to $R_8$ are each independently selected from among linear or branched $C_1$ to $C_{10}$ alkyl group, $C_1$ to $C_{10}$ aminoalkyl group, $C_1$ to $C_{10}$ hydroxyalkyl group, $C_1$ to $C_{20}$ haloalkyl group, $C_3$ to $C_{15}$ cycloalkyl group, $C_6$ to $C_{12}$ aryl group, $C_7$ to $C_{20}$ aralkyl group and $C_2$ to $C_{20}$ alkenyl group; a, b and c are each an integer ranging from 1 to 100; and at least one of $R_1$ and $R_8$ is a vinyl group.)

In one embodiment, the method may further comprise a step of subjecting the first cured product to second curing at a temperature between about 100° C. and about 250° C.

An aspect of the present invention is to provide a silicone rubber composition which has excellent mechanical strength and which may be prevented from yellowing.

Another aspect of the present invention is to provide a silicone rubber composition having excellent resilience and mold release properties.

A further aspect of the present invention is to provide a silicone rubber composition having excellent appearance, reliability and durability properties.

A further aspect of the present invention is to provide a method for preparing the silicone rubber composition.

A further aspect of the present invention is to provide a method for preparing the silicone rubber composition, in which the silicone rubber composition is prepared in an environmentally friendly manner while minimizing the generation of toxic gas.

The silicone rubber composition according to the invention has excellent mechanical strength, is prevented from yellowing even after second curing, and has an excellent ability to recover from compressive deformation, and excellent mold release, appearance, reliability and durability properties. Due to such excellent properties, the composition is suitable for use as medical silicone rubber products. In addition, the silicone rubber composition may be prepared in an environmentally friendly manner while minimizing the generation of toxic gas.

DESCRIPTION OF EMBODIMENTS

In the following description, the detailed description of related known technology or configuration will be omitted when it may obscure the subject matter of the present invention.

Also, the terms used in the following description are terms defined taking into consideration the functions obtained in accordance with embodiments of the present invention, and may be changed in accordance with the option of a user or operator or a usual practice. Accordingly, the definition of the terms should be made based on the contents throughout the specification.

Generally, the silicone rubber cured by organic peroxide shows yellowing. Specifically, immediately after vulcanization (first curing), the silicone rubber product cured by organic peroxide appears to have a slight yellow color and show no yellowing. However, after post-vulcanization (second curing; generally at 200° C. for 4 hours) essential in various applications, the silicone rubber product shows significant yellowing. Herein, the degree of yellowing is significantly influenced by the kind of peroxide used for the curing of silicone rubber. For example, dicumyl peroxide that is applied to compression-molded products causes significant yellowing compared to 2,5-dimethyl-2,5-di(tert-butylperoxide)hexane and di(tert-butyl)peroxide. In addition, it is known that the degree of yellowing is influenced by the kind of silica that is a reinforcing filler applied to silicone rubber. For example, precipitated silica, a reinforcing filler that is typically used for silicone rubber, causes significant yellowing compared to fumed silica. This is mainly because of the difference in the content of silanol groups on the silica surface by a difference between the methods (precipitation and fuming) for preparing silica. It is known that, as the content of silanol groups increases, the degree of yellowing increases.

Yellowing may be reduced by adding polymethylhydrogensiloxane, which is an anti-yellowing additive, to a silicone rubber composition that may be crosslinked by organic peroxide. In addition, in order to reduce yellowing caused by the use of the above-described reinforcing filler silica, only fumed silica is used in the preparation of silicone rubber, or fumed silica and precipitated silica are added in combination, and then organic peroxide is applied as a curing agent. In this case, yellowing may be greatly reduced, but it is difficult to avoid occurrence after second curing.

Meanwhile, when silicone rubber is cured by an addition reaction in the presence of a platinum catalyst, yellowing may be eliminated. However, when a silicone rubber product is prepared using fumed silica and a curing method that is performed by an addition reaction in the presence of a platinum catalyst, the resilience of the silicone rubber product is significantly lower than that of a silicone rubber product prepared using precipitated silica and the organic peroxide curing method. In an attempt to improve resilience, a method of adding a vinyl group-containing silazane and a method of adding a metal oxide may be used. However, in the case in which the silizane is used, a sufficient increase in the compression set of the product is not achieved, and ammonia may be generated during the preparation process. In addition, in the case in which a metal oxide such as cerium oxide is added, the compression set of the product is increased, but other mechanical properties are reduced and the addition of the metal oxide makes it difficult to achieve a clear color.

In addition, as described above, the silicone rubber product cured by organic peroxide regardless of the kind of silica applied to silicone rubber shows yellowing after second curing, and to avoid this yellowing, low-molecular-weight polymethylhydrogensiloxane known as an anti-yellowing agent may be added. However, as the amount of polymethylhydrogensiloxane added increases, the adhesion of the rubber product to the mold surface (mold adhesion) during the molding of the product increases, making it difficult to release the molded product from the mold. Furthermore, self-bleeding or migration occurs with the passage of time to cause fogging of the molded product and the adhesion of the molded product to other metal material.

In addition to the yellowing, the resilience of a silicone rubber product prepared using fumed silica is significantly lower than that of a silicone rubber product prepared using precipitated silica. This is caused by the effects of the aggregate structure and silanol group of fumed silica.

One aspect of the present invention relates to a silicone rubber composition. The silicone rubber composition comprises a polydimethylvinylsiloxane, a silica filler, a polymethylvinylsiloxane oil, a hydrogen-modified polyorganosiloxane, a platinum-based catalyst, and a polymethylhydrogensiloxane vulcanizing agent.

Hereinafter, the silicone rubber composition according to embodiments of the present invention will be described in detail.

Polydimethylvinylsiloxane

The polydimethylvinylsiloxane is represented by the following formula 1:

[Formula 1]

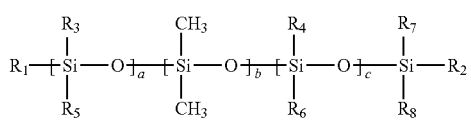

wherein $R_1$ to $R_8$ are each independently selected from among linear or branched $C_1$ to $C_{10}$ alkyl group, $C_1$ to $C_{10}$ aminoalkyl group, $C_1$ to $C_{10}$ hydroxyalkyl group, $C_1$ to $C_{20}$ haloalkyl group, $C_3$ to $C_{15}$ cycloalkyl group, $C_6$ to $C_{12}$ aryl group, $C_7$ to $C_{20}$ aralkyl group and $C_2$ to $C_{20}$ alkenyl group;

a, b and c are each an integer ranging from 1 to 100; and at least one of $R_1$ and $R_8$ is a vinyl group.

In an embodiment, the linear or branched $C_1$ to $C_{10}$ alkyl groups include methyl, ethyl, n-propyl, isopropyl, n-butyl, isobutyl, tert-butyl, n-pentyl, isopentyl, neopentyl, hexyl, heptyl, octyl, nonyl, and decyl.

In an embodiment, the $C_1$ to $C_{10}$ aminoalkyl groups include methylamino, dimethylamino, ethylamino, diethylamino, dipropylamino and dibutylamino groups.

In an embodiment, the $C_1$ to $C_{10}$ hydroxyalkyl groups include hydroxymethyl, hydroxyethyl and hydroxypropyl.

In an embodiment, the $C_1$ to $C_{20}$ haloalkyl groups include fluoroalkyl groups such as trifluoropropyl, heptafluoropentyl, heptafluoroisopentyl, tridecafluoroethyl and heptadecafluorodecyl; and chloroalkyl groups such as chloromethyl, chloroethyl and chloropropyl.

In an embodiment, the $C_3$ to $C_{15}$ cycloalkyl groups include cyclopropyl, cyclobutyl, cyclopentyl, cyclohexyl, cycloheptyl, cyclooctyl, cyclononyl, cyclodecyl, cycloundecyl, cyclodedocyl, butylcyclopropyl, methylcyclopentyl, dimethylcyclohexyl, ethyldimethylcycloheptyl and dimethylcyclooctyl.

In an embodiment, the $C_6$ to $C_{12}$ aryl groups include phenyl, tolyl, xylyl and naphthyl groups.

In an embodiment, the $C_7$ to $C_{20}$ aralkyl groups include methylphenyl, ethylphenyl, methylnaphthyl and dimethylnaphthyl groups.

In an embodiment, the $C_2$ to $C_{20}$ alkenyl groups include vinyl, propinyl, butynyl, pentynyl, hexynyl, octynyl, decenyl, hexadecenyl and octadecenyl groups.

In an embodiment, the polydimethylvinylsiloxane may have a vinyl content ranging from about 0.01 mole % to about 0.4 mole %. In this range, it may have excellent curing properties. For example, the vinyl content of the polydimethylvinylsiloxane may range from about 0.01 mole % to about 0.35 mole %.

The polydimethylvinylsiloxane may have a viscosity of about 10,000,000 cps to about 150,000,000 cps as measured at 25° C. When this polydimethylvinylsiloxane is used, the silica filler as described below may have excellent dispersibility and processability.

In addition, the polydimethylvinylsiloxane may be a mixture of two or more polydimethylvinylsiloxanes having different viscosities. In one embodiment, the polydimethylvinylsiloxane may be a mixture obtained by mixing a first polydimethylvinylsiloxane having a viscosity of about 10,000,000 cps to about 300,000,000 cps, as measured at 25° C., with a second polydimethylvinylsiloxane having a viscosity of about 35,000,000 cps to about 120,000,000 cps, as measured at 25° C., at a weight ratio of about 1:0.1 to about 1:3. When this mixture is used, the silica filler as described below may have excellent dispersibility and processability.

The degree of polymerization of the polydimethylvinylsiloxane may range from about 100 to about 20,000. In this range, the composition according to embodiments of the present invention may have excellent anti-yellowing properties, mechanical properties and processability.

The polydimethylvinylsiloxane may have a weight-average molecular weight (Mw) ranging from about 300,000 g/mol to about 1,500,000 g/mol. In this range, the composition according to embodiments of the present invention may have excellent mechanical properties and processability. For example, the polydimethylvinylsiloxane may have a weight-average molecular weight (Mw) ranging from about 300,000 g/mol to about 800,000 g/mol.

Silica Filler

In embodiments of the present invention, the silica filler is included for the purpose of increasing the mechanical strength of the composition. The silica filler may be amorphous or crystalline. The silica filler may comprise one or more of fumed silica and precipitated silica. For example, fumed silica may be used. For example, one or more of fumed silica and precipitated silica may be used.

The silica filler that is used in embodiments of the present invention has a BET specific surface area ranging from about 50 m$^2$/g to about 500 m$^2$/g. In this specific surface area range, the composition according to embodiments of the present invention may have excellent mechanical properties.

The silica filler may have an average particle size ranging from about 5 nm to about 30 µm and a specific gravity ranging from about 1.5 g/cm$^2$ to about 2.5 g/cm$^2$. In this range, the silica filler may be easily dispersed so that the workability and strength of the composition may be improved. As used herein, the term "size" of the silica filler is defined as the "largest length of silica filler particles".

In an embodiment, the silica filler may be surface-treated with one or more of a silane-based surface treatment agent and a silazane-based surface treatment agent. In an embodiment, the silane-based surface treatment agent may comprise one or more selected from among methyltrimethoxysilane, dimethyltrimethoxysilane, phenyltrimethoxysilane, methyltriethoxysilane, dimethyltriethoxysilane, phenyltriethoxysilane, hexyltrimethoxysilane, hexyltriethoxysilane, decyltrimethoxysilane, trifluoropropyl trimethoxysilane, hexamethyldisiloxane, trimethylmethoxysilane, ethyltrimethoxysilane, trimethylethoxysilane and dimethyldiethoxysilane.

The silazane-based surface treatment agent may comprise one or more selected from among divinyltetramethyldisilazane, octamethylcyclotetrasilazane and hexamethyl disilazane.

When the silica filler is surface-treated with the surface treatment agent, the silica filler may react with the water of air to form a hydrogen bond to thereby inhibit an increase in plasticity while the appearance and transparency of the composition according to embodiments of the present invention are maintained.

In the silica filler is included in an amount ranging from about 5 parts by weight to about 100 parts by weight based on 100 parts by weight of the polydimethylvinylsiloxane. In this range, the composition according to embodiments of the present invention has excellent mechanical strength and dispersibility. If the silica filler is included in an amount of less than about 5 parts by weight, the composition will have weak mechanical strength, and if it is included in an amount of more than about 100 parts by weight, the workability of the composition will be reduced. For example, the silica filler may be included in an amount of about 10 parts by weight to about 70 parts by weight. For example, it may be included in an amount of about 20 parts by weight to about 50 parts by weight. For example, it may be included in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 parts by weight.

Polymethylvinylsiloxane Oil

The polymethylvinylsiloxane oil is included for the purpose of ensuring the recovery of the composition according to embodiments of the present invention from compressive deformation. The polymethylvinylsiloxane oil may contain a vinyl group at both ends or the side chain. For example, it may contain a vinyl group at both ends and the side chain.

The polymethylvinylsiloxane oil has a vinyl content ranging from about 1 mole % to about 20 mole %. In this vinyl content range, the composition has an excellent ability to recover from compressive deformation is excellent. If the vinyl content is less than about 1 mole %, the resilience of the silicone rubber composition according to embodiments of the present invention will be reduced, and if it is more than about 20 mole %, the hardness of the silicone rubber composition will excessively increase so that the brittle failure of the composition will easily occur and the mechanical properties will be reduced.

In an embodiment, the polymethylvinylsiloxane oil may have a viscosity ranging from about 5 cps to about 500 cps as measured at 25° C. In this viscosity range, the composition may have excellent workability.

The polymethylvinylsiloxane oil is included in an amount ranging from about 0.1 to about 15 parts by weight based on 100 parts by weight of the polydimethylvinylsiloxane. In this range, the mechanical strength and resilience of the composition according to embodiments of the present invention may be ensured. If the polymethylvinylsiloxane oil is included in an amount of less than about 0.1 parts by weight, the resilience of the composition will be weak, and if it is included in an amount of more than about 15 parts by weight, the mechanical properties of the composition will be reduced. For example, the polymethylvinylsiloxane oil may be included in an amount of about 1 parts by weight to about 10 parts by weight. For example, it may be included in an amount of about 1 parts by weight to about 8 parts by weight. For example, it may be included in an amount of about 0.1, 0.2, 0.3, 0.4, 0.5, 1, 1.5, 2, 2.5, 3, 3.5, 4, 4.5, 5, 6, 7, 8, 9, 10, 11, 12, 13, 14 or 15 parts by weight.

Hydrogen-Modified Polyorganosiloxane

The hydrogen-modified polyorganosiloxane is included for the purpose of ensuring the anti-yellowing properties, resilience and mechanical properties of the first cured product even after second curing. The hydrogen-modified polyorganosiloxane may contain a vinyl group at both ends and hydrogen at the side chain, or may contain a vinyl group at the side chain and hydrogen at both ends.

In one embodiment, the hydrogen-modified polyorganosiloxane has a vinyl content ranging from about 1 mole % to about 20 mole %. In this range, the composition according to embodiments of the present invention has excellent mechanical strength and resilience. If the vinyl content is less than about 1 mole %, the resilience of the silicone rubber composition will be reduced, and if it is more than about 20 mole %, the hardness of the silicone rubber composition will excessively increase so that the brittle failure of the composition will easily occur and the mechanical properties will be reduced.

In addition, the hydrogen-modified polyorganosiloxane has a hydrogen content ranging from about 0.05 mole % to about 20 mole %. In this range, the composition has excellent resilience and mechanical strength. If the hydrogen content is less than about 0.05 mole %, the resilience of the silicone rubber composition will be reduced, and if it is more than about 20 mole %, the curing rate of the silicone rubber will excessively increase to cause a scorching phenomenon during molding and make it difficult to control the curing rate.

In an embodiment of the present invention, the hydrogen-modified polyorganosiloxane may be presented by the following formula 2:

[Formula 2]

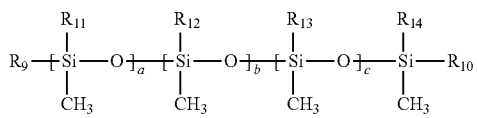

wherein $R_9$ and $R_{10}$ are each independently selected from among hydrogen, linear or branched $C_1$ to $C_{10}$ alkyl group, $C_2$ to $C_{20}$ alkenyl group, $C_3$ to $C_{15}$ cycloalkyl group, $C_1$ to $C_{10}$ aminoalkyl group, $C_1$ to $C_{10}$ hydroxyalkyl group and $C_1$ to $C_{20}$ haloalkyl group; $R_{11}$, $R_{12}$, $R_{13}$ and $R_{14}$ are each independently selected from hydrogen, linear or branched $C_1$ to $C_{10}$ alkyl group, $C_1$ to $C_{10}$ aminoalkyl group, $C_1$ to $C_{10}$ hydroxyalkyl group, $C_1$ to $C_{20}$ haloalkyl group, $C_3$ to $C_{15}$ cycloalkyl group, $C_6$ to $C_{12}$ aryl group, $C_7$ to $C_{20}$ aralkyl group and $C_2$ to $C_{20}$ alkenyl group; l, m and n are each an integer ranging from 1 to 30; at least one of $R_9$ to $R_{14}$ is hydrogen; and at least one of $R_9$ to $R_{14}$ is a vinyl group.

In an embodiment, the linear or branched $C_1$ to $C_{10}$ alkyl groups include methyl, ethyl, n-propyl, isopropyl, n-butyl, isobutyl, tert-butyl, n-pentyl, isopentyl, neopentyl, hexyl, heptyl, octyl, nonyl, and decyl.

In an embodiment, the $C_1$ to $C_{10}$ aminoalkyl groups include methylamino, dimethylamino, ethylamino, diethylamino, dipropylamino and dibutylamino groups.

In an embodiment, the $C_1$ to $C_{10}$ hydroxyalkyl groups include hydroxymethyl, hydroxyethyl and hydroxypropyl.

In an embodiment, the $C_1$ to $C_{20}$ haloalkyl groups include fluoroalkyl groups such as trifluoropropyl, heptafluoropentyl, heptafluoroisopentyl, tridecafluoroethyl and heptadecafluorodecyl; and chloroalkyl groups such as chloromethyl, chloroethyl and chloropropyl.

In an embodiment, the $C_3$ to $C_{15}$ cycloalkyl groups include cyclopropyl, cyclobutyl, cyclopentyl, cyclohexyl, cycloheptyl, cyclooctyl, cyclononyl, cyclodecyl, cycloundecyl, cyclodedocyl, butylcyclopropyl, methylcyclopentyl, dimethylcyclohexyl, ethyldimethylcycloheptyl and dimethylcyclooctyl.

In an embodiment, the $C_6$ to $C_{12}$ aryl groups include phenyl, tolyl, xylyl and naphthyl groups.

In an embodiment, the $C_7$ to $C_{20}$ aralkyl groups include methylphenyl, ethylphenyl, methylnaphthyl and dimethylnaphthyl groups.

In an embodiment, the $C_2$ to $C_{20}$ alkenyl groups include vinyl, propinyl, butynyl, pentynyl, hexynyl, octynyl, decenyl, hexadecenyl and octadecenyl groups.

The hydrogen-modified polyorganosiloxane may have a viscosity ranging from about 50 cps to about 150 cps as measured at 25° C. In this range, the composition may have excellent workability.

In an embodiment, the hydrogen-modified polyorganosiloxane may comprise α,ω-di(vinyl), dimethyl, methyl-vinyl, methylhydrogen polysiloxane.

The α,ω-di(vinyl), dimethyl, methyl-vinyl, methylhydrogen polysiloxane may be represented by the following formula 3:

[Formula 3]

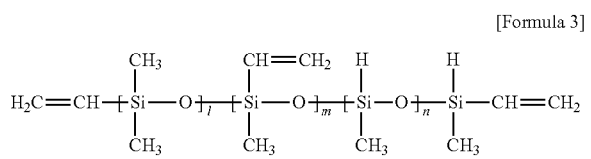

wherein l, m and n are each an integer ranging from 1 to 30.

The hydrogen-modified polyorganosiloxane is included in an amount ranging from about 0.1 parts by weight to about 5 parts by weight based on 100 parts by weight of the polydimethylvinylsiloxane. In this range, the composition according to embodiments of the present invention may ensure mechanical strength and resilience. If the hydrogen-modified polyorganosiloxane is included in an amount of less than about 0.1 parts by weight, the composition will have weak resilience, and if it is included in an amount of more than about 5 parts by weight, it will be difficult to control the curing rate of the composition, and the moldability of the composition will be reduced. For example, the hydrogen-modified polyorganosiloxane may be included in an amount of about 0.5 parts by weight to about 3 parts by weight. For example, it may be included in an amount of about 1 parts by weight to about 3 parts by weight. For example, it may be included in an amount of about 0.1, 0.2, 0.3, 0.4, 0.5, 1, 1.5, 2, 2.5, 3, 3.5, 4, 4.5 or 5 parts by weight.

Platinum-Based Catalyst

The platinum-based catalyst is included for the purpose of promoting the curing reaction (or hydrosilylation reaction) of the silicone rubber composition according to embodiments of the present invention. The platinum-based catalyst that is used in embodiments of the present invention may be a typical platinum-based catalyst. For example, the platinum-based catalyst may comprise one or more selected from among fine platinum powder, platinum black, chloroplatinate, alcohol-modified chloroplatinate, chloroplatinate-olefin complexes, chloroplatinate-alkenylsiloxane complexes, and chloroplatinate-divinyltetramethyldisiloxane complexes.

The platinum-based catalyst is included in an amount ranging from about 0.0001 parts by weight to about 3 parts by weight based on 100 parts by weight of the polydimethylvinylsiloxane. In this range, it is easy to control the curing reaction rate of the composition according to embodiments of the present invention. If the platinum-based catalyst is included in an amount of less than about 0.0001 parts by weight, it will be difficult to control the curing reaction rate of the composition, and if it is included in an amount of more than about 3 parts by weight, an increase in the content of the platinum-based catalyst will not lead to a further increase in the curing reaction rate and will be cost-ineffective. For example, the platinum-based catalyst may be included in an amount of about 0.01 parts by weight to about 3 parts by weight. For example, it may be included in an amount of about 0.03 parts by weight to about 2 parts by weight. For example, it may be included in an amount of about 0.0001, 0.0005, 0.001, 0.002, 0.003, 0.004, 0.005, 0.1, 0.15, 0.2, 0.3, 0.4, 0.5, 1, 1.5, 2, 2.5 or 3 parts by weight.

Polymethylhydrogensiloxane Vulcanizing Agent

The polymethylhydrogensiloxane vulcanizing agent is included for the purpose of vulcanization (crosslinking). The polymethylhydrogensiloxane vulcanizing agent may be an organopolysiloxane structure containing a hydrogen atom at both ends or the side chain.

In an embodiment, the polymethylhydrogensiloxane vulcanizing agent may comprise one or more selected from among methylhydrogensiloxanes blocked with a trimethylsiloxy group at both ends, a copolymer of a dimethylsiloxane blocked with a trimethylsiloxy group at both ends and methylhydrogensiloxane, a copolymer of a dimethylsiloxane blocked with a dimethylhydrogensiloxy group at both ends and methylhydrogensiloxane, and tetramethyltetrahydrogen cyclotetrasiloxane.

In one embodiment, the molar ratio of an alkenyl group in the polydimethylvinylsiloxane to an alkenyl group in the polymethylhydrogensiloxane vulcanizing agent may be about 1:0.1 to about 1:2. At this molar ratio, the composition according to embodiments of the present invention may have excellent mechanical properties. Herein, the alkenyl group may be one or more selected from among vinyl, allyl, propenyl and butenyl groups.

The polymethylhydrogensiloxane vulcanizing agent is included in an amount ranging from about 0.1 parts by weight to about 5 parts by weight based on 100 parts by weight of polydimethylvinylsiloxane. In this range, the mechanical strength and resilience of the composition according to embodiments of the present invention may be ensured. If the polymethylhydrogensiloxane vulcanizing agent is included in an amount of less than about 0.1 parts by weight, the vulcanization reaction of the composition will not occur so that the mechanical strength thereof will be reduced, and if it is included in an amount of more than about 5 parts by weight, the mechanical strength of the composition will be reduced. For example, the polymethylhydrogensiloxane vulcanizing agent may be included in an amount of about 0.1 parts by weight to about 3 parts by weight. For example, it may be included in an amount of about 0.1 parts by weight to about 2 parts by weight. For example, it may be included in an amount of about 0.1, 0.2, 0.3, 0.4, 0.5, 1, 1.5, 2, 2.5, 3, 3.5, 4, 4.5 or 5 parts by weight.

In other embodiments of the present invention, the silicone rubber composition may further comprise a plasticizer, a release agent and a curing retarder.

Plasticizer

The plasticizer may be included for the purposes of increasing the compatibility and dispersibility of the hydrophilic silica component and the hydrophobic siloxane component and improving the storage stability and moldability of the silicone rubber composition according to embodiments of the present invention and also enhancing the physical properties of the silicone rubber. The plasticizer may comprise a polydimethylsiloxane plasticizer. For example, it may comprise a polydimethylsiloxane (PDMS) containing a hydroxyl group at both ends.

In an embodiment, the polydimethylsiloxane plasticizer may have a viscosity of about 5 cps to about 500 cps as measured at 25° C. At this range, it may have excellent workability.

The plasticizer may have a hydroxyl group content of about 5 wt % to about 20 wt % (weight percent). In this hydroxyl group content, the plasticizer may have excellent effects of enhancing the compatibility, dispersibility, storage stability and physical properties of the silicone rubber composition.

The plasticizer may be included in an amount ranging from about 1 parts by weight to about 20 parts by weight based on 100 parts by weight of the polydimethylvinylsiloxane. In this range, the composition according to embodiments of the present invention may show excellent compatibility, storage stability and physical properties while the plasticizer is easily mixed. For example, the plasticizer may be included in an amount of about 1 parts by weight to about 15 parts by weight. For example, it may be included in an amount of about 1 parts by weight to about 8 parts by weight. For example, it may be included in an amount of about 1, 1.5, 2, 2.5, 3, 3.5, 4, 4.5, 5, 5.5, 6, 6.5, 7, 7.5, 8, 9, 10, 11, 12, 13, 14, 15, 16, 17, 18, 19 or 20 parts by weight.

Release Agent

The release agent may be included for the purpose of ensuring the release of the silicone rubber composition according to embodiments of the present invention from a mold.

The release agent may be a compound selected from the group consisting of organic fatty acids and their metal salts. In an embodiment, the release agent may comprise one or more selected from among stearic acid, zinc stearate, calcium stearate, and metal salts thereof.

The release agent may be included in an amount ranging from about 0.01 parts by weight to about 5 parts by weight based on 100 parts by weight of the polydimethylvinylsiloxane. In this range, the release property of the composition is ensured, and thus the composition may be easily released from a mold and a kneader, ink may be printed on the surface of the first cured product, and contamination of the mold may be prevented. For example, the release agent may be included in an amount of about 0.05 parts by weight to about 3 parts by weight. For example, it may be included in an amount of about 0.1 parts by weight to about 3 parts by weight. For example, it may be included in an amount of about 0.01, 0.05, 0.1, 0.15, 0.2, 0.25, 0.3, 0.4, 0.5, 1, 1.5, 2, 2.5, 3, 3.5, 4, 4.5 or 5 parts by weight.

Curing Retarder

The curing retarder may be included for the purpose of controlling the curing rate of the silicone rubber composition according to embodiments of the present invention.

In an embodiment, the curing retarder may comprise one or more selected from among 2-methyl-3-butyn-2-ol, 2-phenyl-3-butyn-2-ol, 3,5-dimethyl-1-hexyn-3-ol, 1-ethynylcyclohexanol, 1,5-hexadiyne, 1,6-heptadiyne, 3,5-dimethyl-1-hexen-1-yne, 3-ethyl-3-buten-1-yne, 3-phenyl-3-buten-1-yne, 1,3-divinyltetramethyldisiloxane, 1,3,5,7-tetravinyltetramethylcyclotetrasiloxane, 1,3-divinyl-1,3-diphenyldimethyldisiloxane, methyltris(3-methyl-1-butyn-3-oxy)silane, tributylamine, tetramethylethylenediamine, benzotriazole, triphenylphosphine, sulfur-containing compounds, hydroperoxy compounds, maleic acid derivative-1-ethynylcyclohexanol, and 3-methyl-1-penten-3-ol.

In an embodiment, the curing retarder may be included in an amount ranging from about 0.001 parts by weight to about 3 parts by weight based on 100 parts by weight of the polydimethylvinylsiloxane. In this range, the curing retarder may exhibit an excellent effect of controlling the curing rate without impairing the physical properties of the composition according to embodiments of the present invention. For example, the curing retarder may be included in an amount of about 0.01 parts by weight to about 2 parts by weight. For example, it may be included in an amount of about 0.01 parts by weight to about 1 part by weight. For example, it may be included in an amount of about 0.001, 0.002, 0.003, 0.004, 0.005, 0.1, 0.15, 0.2, 0.3, 0.4, 0.5, 1, 1.5, 2, 2.5 or 3 parts by weight.

In other embodiments, the silicone rubber composition may further comprise, in addition to the above-described components, typical additives within a range that does not impair the purpose of the present invention.

Another aspect of the present invention relates to a method for preparing the silicone rubber composition. In an embodiment, the method for preparing the silicone rubber composition comprises: (a) a step of hating a first mixture; (b) a step of depressurizing the heated first mixture; (c) a step of preparing a second mixture; and (d) a step of subjecting the second mixture to molding and first curing. More specifically, the method comprises the steps of: heating a first mixture, which comprises 100 parts by weight of a polydimethylvinylsiloxane represented by the following formula 1, about 5 parts by weight to about 100 parts by weight of a silica filler, and about 0.1 parts by weight to about 15 parts by weight of a polymethylvinylsiloxane oil containing about 1 mole % to about 20 mole % of a vinyl group, at a temperature between about 120° C. and about 180° C.; depressurizing the heated first mixture to about 0.5 bar to about 0.9 bar; adding, to the first mixture, about 0.1 parts by weight to about 5 parts by weight of a hydrogen-modified polyorganosiloxane containing about 1 mole % to about 20 mole % of a vinyl group and about 0.05 mole % to about 20 mole % of hydrogen, about 0.0001 parts by weight to about 3 parts by weight of a platinum-based catalyst, and about 0.1 parts by weight to about 5 parts by weight of a polymethylhydrogensiloxane vulcanizing agent, followed by mixing at a temperature between about 50° C. and about 70° C. to prepare a second mixture; and subjecting the second mixture to molding and first curing to prepare a first cured product:

[Formula 1]

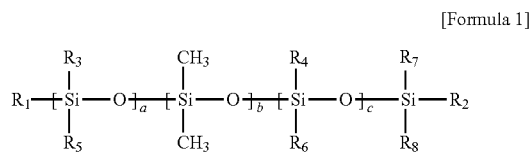

wherein $R_1$ to $R_8$ are each independently selected from among linear or branched $C_1$ to $C_{10}$ alkyl group, $C_1$ to $C_{10}$ aminoalkyl group, $C_1$ to $C_{10}$ hydroxyalkyl group, $C_1$ to $C_{20}$ haloalkyl group, $C_3$ to $C_{15}$ cycloalkyl group, $C_6$ to $C_{12}$ aryl group, $C_7$ to $C_{20}$ aralkyl group and $C_2$ to $C_{20}$ alkenyl group; a, b and c are each an integer ranging from 1 to 100; and at least one of $R_1$ and $R_8$ is a vinyl group.

Hereinafter, each step of the method for preparing the silicone rubber composition will be described in detail.

(a) Step of Heating First Mixture

This step is a step of heating a first mixture comprising the above-described polydimethylvinylsiloxane, silica filler and polymethylvinylsiloxane oil at a temperature between about 120□ and about 180□. In embodiments of the present invention, the first mixture may be prepared using one or more selected from among a two-roll mill, a Banbury kneader, an open kneader and a single or twin screw kneader. In an embodiment, 100 parts by weight of the polydimethylvinylsiloxane, about 5 parts by weight to about 100 parts by weight of the silica filler and about 0.1 parts by weight to about 15 parts by weight of the polymethylvinylsiloxane oil may be fed into a kneader and mixed with one another to prepare a first mixture, and the first mixture may be heated at a temperature between about 120□ and about 180□. If the heating temperature is lower than about 120□, sufficient kneading may not be achieved, and if it is higher than about 180□, the siloxane bond may be cleaved. The polydimethylvinylsiloxane, silica filler and polymethylvinylsiloxane oil components are as described above, the detailed description thereof is omitted.

In addition, in the preparation of the first mixture, the silica filler and the polymethylvinylsiloxane oil may be fed a plurality of times in portions for the purpose of improving the dispersibility and workability thereof.

(b) Step of Depressurizing Heated First Mixture

This step is a step of depressurizing the heated first mixture to about 0.5 bar to about 0.9 bar while maintain the heating temperature. This step is performed for the purpose of removing unreacted silane, water, byproducts and volatile components, which are produced during the preparation and heating of the first mixture.

If the first mixture is depressurized to less than about 0.5 bar, unreacted silane, water, byproducts and volatile components will not be easily removed, and if it is depressurized to more than about 0.9 bar, the physical properties, yellowing resistance and resilience of the composition will be reduced.

In an embodiment, the depressurization may be performed for about 30 minutes to about 3 hours. When the depressurization is performed for this period of time, unreacted silane, water, byproducts and volatile components may be easily removed while the physical properties, yellowing resistance and resilience of the composition may be ensured. The volatile components that are discharged during depressurization may be captured using a cooling trap, a scrubber or the like.

(c) Step of Preparing Second Mixture

This step is a step of adding, to the first mixture, the above-described platinum-based catalyst, hydrogen-modified polyorganosiloxane and polymethylhydrogensiloxane vulcanizing agent, followed by mixing at a temperature between about 50° C. and about 70° C. to prepare a second mixture.

In an embodiment, the second mixture may be prepared by lowering the temperature to about 50° C. to about 70° C., and then adding, based on 100 parts by weight of the polydimethylvinylsiloxane, about 0.0001 parts by weight to about 3 parts by weight of the platinum-based catalyst, about 0.1 parts by weight to about 5 parts by weight of the hydrogen-modified polyorganosiloxane and about 0.1 parts by weight to about 5 parts by weight of the polymethylhydrogensiloxane vulcanizing agent to the first mixture, followed by mixing. The platinum-based catalyst, hydrogen-modified polyorganosiloxane and polymethylhydrogensiloxane vulcanizing agent components are as described above, and thus the detailed description thereof is omitted.

In another embodiment, the second mixture may be prepared by lowering the temperature to about 50° C. to about 70° C., and then adding, based on 100 parts by weight of the polydimethylvinylsiloxane, about 0.0001 parts by weight to about 3 parts by weight of the platinum-based catalyst, about 0.1 parts by weight to about 5 parts by weight of the hydrogen-modified polyorganosiloxane, about 0.1 parts by weight to about 5 parts by weight of the polymethylhydrogensiloxane vulcanizing agent, about 1 parts by weight to about 5 parts by weight of the plasticizer, about 0.01 parts by weight to about 5 parts by weight of the release agent and about 0.001 parts by weight to about 3 parts by weight of the curing retarder, followed by mixing.

(d) Step of Subjecting Second Mixture to Molding and First Curing

This step is a step of subjecting the second mixture to molding and first curing to prepare a first cured product. In an embodiment, the first curing may comprise curing the second mixture at a temperature between about 110° C. and about 160° C. for about 1 hours to about 5 hours to prepare a first cured product. In embodiments of the present invention, the molding may be performed using various methods, including extrusion and injection molding methods.

In addition, although the composition according to embodiments of the present invention has excellent anti-yellowing properties, mechanical properties and resilience properties as a result of the first curing, the method according to embodiments of the present invention may further comprise a step of subjecting the first cured product to second curing at a temperature between 100° C. and about 250° C. in order to further improve the physical properties of the composition. In embodiments of the present invention, the second cured product following the second curing has excellent resilience and mechanical properties while the yellowing thereof may be inhibited, unlike typical silicone rubber compositions that undergo yellowing during second curing. As described above, the composition according to embodiments of the present invention may be prepared in an environmentally friendly manner while minimizing the generation of toxic gas.

Hereinafter, examples of the present invention will be described in further detail. It is to be understood, however, that these examples are provided for a better understanding of the present invention and are not intended to limit the scope of the present invention. Contents that are not disclosed herein may be sufficiently understood by any person skilled in the art, and thus the description thereof is omitted.

EXAMPLES AND COMPARATIVE EXAMPLES

The detailed specifications of the components used in the Examples and the Comparative Examples are as follows.

(A) Polydimethylvinylsiloxane (A1) T 722™ (Grace Continental Korea Co., Ltd.), which has a vinyl content of 0.03 mole % and a molecular weight of 600,000 g/mol and contains a dimethylvinylsilyl group at both ends, was used.

(A2) T 5™ (Grace Continental Korea Co., Ltd.), which has a vinyl content of 0.16 mole % and a molecular weight of 610,000 g/mol and contains a dimethylvinylsilyl group at both ends, was used.

(A3) T 4.5™ (Grace Continental Korea Co., Ltd.), which has a vinyl content of 4.0 mole % and a molecular weight of 560,000 g/mol and contains a dimethylvinylsilyl group at both ends, was used.

(B) Silica Filler (B1) Sipernat-288 (Evonik), which is precipitated silica having a BET specific surface area of 200 $m^2/g$, was used.

(B2) Aerosil 200 (Evonik), which is fumed silica having a BET specific surface area of 200 $m^2/g$, was used.

(C) Polymethylvinylsiloxane Oil

TP-12 (Grace Continental Korea Co., Ltd.), which has a vinyl content of 5 mole % and a viscosity of 400 cps as measured at 25° C., was used.

(D) Hydrogen-Modified Polyorganosiloxane

TP-13 ($\alpha,\omega$-di(vinyl), dimethyl, methyl-vinyl, methylhydrogen polysiloxane; Grace Continental Korea Co., Ltd.), which has a vinyl content of 7.8 mole %, a hydrogen content of 6.85 mole % and a viscosity of 60 cps as measured at 25° C., was used.

(E1) Platinum-Based Catalyst

Cat-Pt A (Grace Continental Korea Co., Ltd.) was used.

(E2) Peroxide-Based Catalyst

DBPMH (2,5-dimethyl-2,5-di(tert-butylperoxide)hexane) (Akzo Nobel) was used.

(F) Polymethylhydrogensiloxane Vulcanizing Agent

THP-11A (Grace Continental Korea Co., Ltd.) having a hydrogen content of 0.7 wt % was used.

(G) Plasticizer

A-89 (Grace Continental Korea Co., Ltd.), which contains a hydroxyl group at both ends and has a hydroxyl group content of 13 wt % and a viscosity of 20 cps as measured at 25° C., was used.

(H) Release Agent

THP-10 (Grace Continental Korea Co., Ltd.), obtained by mixing a silicone-based resin with 70 wt % of zinc stearate, was used.

(I) Curing Retarder

1-Ethinylcyclohexanol (BASF) was used.

Example 1

Components (A) to (I) as described above were prepared in the amounts shown in Table 1 below and were mixed with one another in the following manner, thereby preparing a first cured product in the form of a sheet.

Specifically, 100 parts by weight of polydimethylvinylsiloxane (A) was fed into a kneader (5 liter, Battaggion, Italy) in the amounts shown in Table 1 below and was uniformly dispersed. Then, silica filler (B) and polymethylvinylsiloxane oil (C) were added to and mixed with the polydimethylvinylsiloxane. To increase the dispersing effect, silica filler (B) and polymethylvinylsiloxane oil (C) were added in two portions and mixed with the polydimethylvinylsiloxane to prepare a first mixture. The first mixture was heated for 2 hours while the temperature was elevated from 80° C. to 160° C.

Next, the first mixture was depressurized under the conditions of 160° C. and 0.8 bar for 2 hours in order to remove water and low-molecular-weight siloxane compound, which are reaction byproducts produced in the kneader.

Next, the internal temperature of the kneader chamber was lowered to 60° C., and then hydrogen-modified polyorganosiloxane (D) was fed into the kneader. Following this, platinum-based catalyst (E1), plasticizer (G), release agent (H) and curing retarder (I) were fed into the kneader and dispersed using a two-roll mill for 5 minutes. Then, polymethylhydrogensiloxane vulcanizing agent (F) was fed into the kneader and uniformly dispersed for 5 minutes, thereby preparing a second mixture. The prepared second mixture was subjected to molding and first curing using a hot press at 140° C. for 10 minutes, thereby preparing a first cured product (sheet) having a size of 15 cm (width)×15 cm (length) and 2 mm (thickness).

Examples 2 to 5

First cured products were prepared in the same as described in Example 1, except that the amounts shown in Table 1 below were applied.

Comparative Examples 1 to 3

First cured products were prepared in the same as described in Example 1, except that polymethylvinylsiloxane oil (C), hydrogen-modified polyorganosiloxane (D) and curing retarder (I) were not used and peroxide-based catalyst (E2) in place of platinum-based catalyst (E1) was added in the amounts shown in Table 1 below.

Comparative Example 4

A first cured product was prepared in the same manner as described in Example 1, except that polymethylvinylsiloxane oil (C), hydrogen-modified polyorganosiloxane (D) and curing retarder (I) were not used.

Comparative Examples 5 and 6

First cured products were prepared in the same as described in Example 1, except that the amounts shown in Table 1 below were applied.

Test Example (1) Specific Gravity

Specific gravity was measured in accordance with KS M 6518, and the results of the measurement are shown in Table 2 below.

(2) Hardness (Shore A)

Hardness was measured with a type A durometer in accordance with KS M 6518, and the results of the measurement are shown in Table 2 below.

(3) Tensile Strength (kgf/cm$^2$)

Tensile strength was measured in accordance with KS M 6518, and the results of the measurement are shown in Table 2 below.

(4) Elongation (%) at Break

Elongation at break was measured in accordance with KS M 6518, and the results of the measurement are shown in Table 2 below.

(5) Tearing Strength (kgf/cm)

Tearing strength was measured in accordance with KS M 6518, and the results of the measurement are shown in Table 2 below.

(6) Plasticity

Plasticity was measured in accordance with JIS K 6249 (Williams plasticizer), and the results of the measurement are shown in Table 2 below.

(7) Mold Release Property

While each of the first cured products of Examples 1 to 5 and Comparative Examples 1 to 6 was prepared using a mold including 64 cavities having a somewhat complex shape, the cycle time was measured. The cycle time is defined as the time taken for the molded product to be completely released from the 64 cavities after the first cured product has been molded in the mold at a certain time for a certain time. The mold release property was evaluated according to the following criteria: very good (◉)=a release time of 200 seconds or shorter; good (◯)=a release time of 250 seconds or shorter; moderate (Δ)=a release time of 300 seconds or shorter; poor (X)=a release time of 300 seconds or longer. The results of the evaluation are shown in Table 2 below.

(8) Resilience Properties (Compression Set (%) and Rebound Resilience (%)

Compression set was measured in accordance with KS M 6518 at 150° C. for 22 hours. In addition, rebound resilience was measured in accordance with KS M 6518. The results of the measurement are shown in Table 2 below.

Second Curing

In order to thermally decompose the remaining curing agent and to stabilize the silicone rubber, each of the first cured products (sheets) prepared in Examples 1 to 5 and Comparative Examples 1 to 6 was subjected to second curing in a hot-air circulation oven at 150° C. for 1 hour, thereby preparing second cured products. The prepared second cured products were cooled at normal temperature for 12 hours or more, and then measured for their physical properties excluding plasticity. The results of the measurement are shown in Table 3 below.

In addition, in order to evaluate the degree of yellowing, the second cured products prepared in Examples 1 to 5 and Comparative Examples 1 to 6 were allowed to stand in a 85% humidity chamber at 85° C. for 168 hours, and then the degree of yellowing thereof was evaluated. The results of the evaluation are shown in Table 3 below.

TABLE 1

| | Unit (parts by weight) | Examples | | | | | Comparative Examples | | | | | |
|---|---|---|---|---|---|---|---|---|---|---|---|---|
| | | 1 | 2 | 3 | 4 | 5 | 1 | 2 | 3 | 4 | 5 | 6 |
| (A) | (A1) | 80 | 80 | 80 | 80 | 80 | 70 | 70 | 70 | 70 | 80 | 80 |
| | (A2) | 20 | 20 | 20 | 20 | 20 | 27.5 | 27.5 | 25 | 25 | 20 | 20 |
| | (A3) | — | — | — | — | — | 2.5 | 2.5 | 5 | 5 | — | — |
| (B) | (B1) | — | 17 | — | — | — | 35 | 35 | — | — | — | — |
| | (B2) | 30 | 17 | 30 | 30 | 30 | — | — | 31 | 31 | 30 | 30 |
| (C) | | 1 | 1 | 2 | 1 | 2 | — | — | — | — | 20 | 1 |
| (D) | | 1 | 1 | 1 | 2 | 2 | — | — | — | — | 2 | 8 |
| (E) | (E1) | 0.1 | 0.1 | 0.1 | 0.1 | 0.1 | — | — | — | 0.1 | 0.1 | 0.1 |
| | (E2) | — | — | — | — | — | 0.4 | 0.2 | 0.2 | — | — | — |
| (F) | | 0.8 | 0.8 | 0.8 | 0.8 | 0.8 | — | 2 | 2 | 0.8 | 0.8 | 0.8 |
| (G) | | 2 | 2 | 2 | 2 | 2 | 2.6 | 2.6 | 3.2 | 3.2 | 2 | 2 |
| (H) | | 0.1 | 0.1 | 0.1 | 0.1 | 0.1 | 0.3 | 0.3 | 0.1 | 0.1 | 0.1 | 0.1 |
| (I) | | 0.03 | 0.03 | 0.03 | 0.03 | 0.03 | — | — | — | 0.03 | 0.03 | 0.03 |

TABLE 2

| | Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| Specific gravity | 1.10 | 1.11 | 1.10 | 1.10 | 1.10 | 1.12 | 1.12 | 1.10 | 1.10 | 1.11 | 1.12 |
| Hardness (Shore A) | 39 | 40 | 37 | 41 | 45 | 40 | 43 | 39 | 40 | 29 | 33 |
| Tensile strength (kgf/cm$^2$) | 92 | 99 | 91 | 96 | 94 | 91 | 89 | 92 | 103 | 79 | 96 |
| Elongation at break (%) | 619 | 707 | 645 | 785 | 802 | 684 | 726 | 735 | 1093 | 562 | 630 |

TABLE 2-continued

|  | Examples | | | | | Comparative Examples | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Tearing strength (kgf/cm) | 32 | 28 | 28 | 35 | 34 | 24 | 25 | 28 | 30 | 28 | 29 |
| Plasticity (Williams) | 142 | 145 | 136 | 129 | 111 | 135 | 131 | 141 | 142 | 75 | 102 |
| Mold release property | ◎ | ◎ | ◎ | ◎ | ◎ | Δ | X | X | X | ○ | Δ |
| Compression set (%) | 34 | 33 | 40 | 38 | 33 | 28 | 26 | 48 | 80 | 36 | 47 |
| Rebound resilience (%) | 35 | 34 | 31 | 32 | 33 | 31 | 30 | 18 | 16 | 35 | 22 |

TABLE 3

|  | Examples | | | | | Comparative Examples | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Specific gravity | 1.10 | 1.11 | 1.10 | 1.10 | 1.10 | 1.10 | 1.10 | 1.10 | 1.10 | 1.10 | 1.10 |
| Hardness (Shore A) | 40 | 41 | 38 | 43 | 46 | 43 | 43 | 42 | 42 | 30 | 34 |
| Tensile strength (kgf/cm$^2$) | 97 | 93 | 92 | 103 | 106 | 94 | 95 | 105 | 113 | 84 | 96 |
| Elongation at break (%) | 606 | 662 | 598 | 747 | 798 | 626 | 675 | 710 | 912 | 554 | 695 |
| Tearing strength (kgf/cm) | 35 | 29 | 27 | 33 | 35 | 26 | 27 | 31 | 32 | 26 | 31 |
| Mold release property | ◎ | ◎ | ◎ | ◎ | ◎ | Δ | X | X | X | Δ | Δ |
| Compression set (%) | 31 | 32 | 38 | 35 | 31 | 37 | 36 | 45 | 76 | 34 | 45 |
| Rebound resilience (%) | 37 | 35 | 32 | 33 | 34 | 26 | 28 | 19 | 18 | 35 | 20 |
| Degree of yellowing | ◎ | ◎ | ◎ | ◎ | ◎ | X | X | X | Δ | ○ | Δ |

As may be seen in Tables 2 and 3 above, in the case of Comparative Examples 1 to 3 in which the curing method employing the platinum catalyst according to embodiments of the present invention was not applied, and Comparative Example 4 in which the polymethylvinylsiloxane oil and the hydrogen-modified polyorganosiloxane were not used, the mechanical properties and resilience were reduced compared to those of Examples 1 to 5, and the mold release and anti-yellowing properties were also reduced. In addition, in the case of Comparative Example 5 in which the polymethylvinylsiloxane oil was used in an amount larger than the amount used in the Examples of the present invention, the physical strength, mold release and anti-yellowing properties were reduced. In the case of Comparative Example 6 in which the hydrogen-modified polyorganosiloxane was used in an amount larger than the amount used in the Examples of the present invention, the mold release and anti-yellowing properties were reduced.

Thus, it may be seen that the silicone rubber composition according to embodiments of the present invention may be more effectively used for products that should not undergo yellowing at high temperature and humidity and, at the same time, should have excellent resilience.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method for preparing a silicone rubber composition, comprising the steps of:
   heating a first mixture, which comprises 100 parts by weight of a polydimethylvinylsiloxane represented by Formula 1, about 5 parts by weight to about 100 parts by weight of a silica filler, and about 0.1 parts by weight to about 15 parts by weight of a polymethylvinylsiloxane oil containing about 1 mole % to about 20 mole % of a vinyl group, at a temperature between about 120° C. and about 180° C.;
   depressurizing the heated first mixture to about 0.5 bar to about 0.9 bar;
   adding, to the first mixture, about 0.1 parts by weight to about 5 parts by weight of a hydrogen-modified polyorganosiloxane containing about 1 mole % to about 20 mole % of a vinyl group and about 0.05 mole % to about 20 mole % of hydrogen, and about 0.0001 parts by weight to about 3 parts by weight of a platinum-based catalyst, and about 0.1 parts by weight to about 5 parts by weight of a polymethylhydrogensiloxane vulcanizing agent, followed by mixing at a temperature between about 50° C. and about 70° C. to prepare a second mixture; and subjecting the second mixture to molding and first curing to prepare a first cured product:

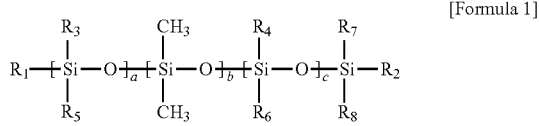

[Formula 1]

wherein $R_1$ to $R_8$ are each independently selected from among linear or branched $C_1$-$C_{10}$ alkyl group, $C_1$ to $C_{10}$ aminoalkyl group, $C_1$ to $C_{10}$ hydroxyalkyl group, $C_1$ to $C_{20}$ haloalkyl group, $C_3$ to $C_{15}$ cycloalkyl group, $C_6$ to $C_{12}$ aryl group, $C_1$-$C_{20}$ aralkyl group and $C_2$-$C_{20}$ alkenyl group; a, b and c are each an integer ranging from 1 to 100; and at least one of $R_1$ and $R_8$ is a vinyl group.

2. The method of claim 1, further comprising a step of subjecting the first cured product to second curing at a temperature between about 100° C. and about 250° C.

3. The method of claim 1, wherein the polydimethylvinylsiloxane has a vinyl content of about 0.01 mole % to about 0.4 mole % and a viscosity of about 10,000,000 cps to about 150,000,000 cps as measured at 25° C.

4. The method of claim 1, wherein the polydimethylvinylsiloxane has a degree of polymerization of about 100 to about 20,000 and a weight-average molecular weight (Mw) of about 300,000 g/mol to about 1,500,000 g/mol.

5. The method of claim 1, wherein the silica filler has a BET specific surface area of about 50 m²/g to about 500 m²/g.

6. The method of claim 1, wherein the silica filler comprises one or more of fumed silica and precipitated silica.

7. The method of claim 1, wherein the silica filler is a silica filler surface-treated with one or more of a silane-based surface treatment agent and a silazane-based surface treatment agent.

8. The method of claim 1, wherein the polymethylvinylsiloxane oil has a viscosity of about 5 cps to about 500 cps as measured at 25° C.

9. The method of claim 1, wherein the hydrogen-modified polyorganosiloxane is represented by Formula 2:

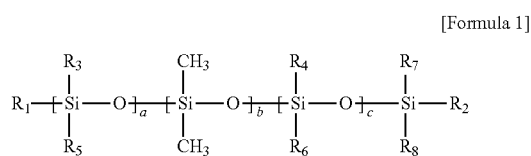

[Formula 1]

wherein R9 and R10 are each independently selected from among hydrogen, linear or branched C1 to C10 alkyl group, C2 to C20 alkenyl group, C3 to C15 cycloalkyl group, C1 to C10 aminoalkyl group, C1 to C10 hydroxyalkyl group and C1 to C20 haloalkyl group; R11, R12, R13 and R14 are each independently selected from hydrogen, linear or branched C1 to C10 alkyl group, C1 to C10 aminoalkyl group, C1 to C10 hydroxyalkyl group, C1 to C20 haloalkyl group, C3 to C15 cycloalkyl group, C6 to C12 aryl group, C7 to C20 aralkyl group and C2 to C20 alkenyl group; l, m and n are each an integer ranging from 1 to 30; at least one of R9 to R14 is hydrogen; and at least one of R9 to R14 is a vinyl group.

10. The method of claim 1, wherein the platinum-based catalyst comprises one or more selected from among fine platinum powder, platinum black, chloroplatinate, alcohol-modified chloroplatinate, chloroplatinate-olefin complexes, chloroplatinate-alkenylsiloxane complexes, and chloroplatinate-divinyltetramethyldisiloxane complexes.

11. The method of claim 1, wherein the polymethylhydrogensiloxane vulcanizing agent comprises one or more selected from among polymethylhydrogensiloxanes blocked with a trimethylsiloxy group at both ends, a copolymer of a dimethylsiloxane blocked with a trimethylsiloxy group at both ends and methylhydrogensiloxane, a copolymer of a dimethylsiloxane blocked with a dimethylhydrogensiloxy group at both ends and methylhydrogensiloxane, and tetramethyltetrahydrogen cyclotetrasiloxane.

12. The method of claim 1, the first mixture further comprising a plasticizer, a release agent and a curing retarder.

13. The method of claim 12, wherein the plasticizer comprises a polydimethylsilixane plasticizer; the release agent comprises one or more selected from among stearic acid, zinc stearate, calcium stearate, and metal salts thereof; and the curing retarder comprises one or more selected from among 2-methyl-3-butyn-2-ol, 2-phenyl-3-butyn-2-ol, 3,5-dimethyl-1-hexyn-3-ol, 1-ethynylcyclohexanol, 1,5-hexadiyne, 1,6-heptadiyne, 3,5-dimethyl-1-hexen-1-yne, 3-ethyl-3-buten-1-yne, 3-phenyl-3-buten-1-yne, 1,3-divinyltetramethyldisiloxane, 1,3,5,7-tetravinyltetramethylcyclotetrasiloxane, 1,3-divinyl-1,3-diphenyldimethyldisiloxane, methyltris(3-methyl-1-butyn-3-oxy)silane, tributylamine, tetramethylethylenediamine, benzotriazole, triphenylphosphine, sulfur-containing compounds, hydroperoxy compounds, maleic acid derivative-1-ethynylcyclohexanol, and 3-methyl-1-penten-3-ol.

14. The method of claim 12, comprising, based on 100 parts by weight of the polydimethylvinylsiloxane, about 1 parts by weight to about 20 parts by weight of the plasticizer, about 0.01 parts by weight to about 5 parts by weight of the release agent, and about 0.001 parts by weight to about 3 parts by weight of the curing retarder.

* * * * *